(12) United States Patent
Yagi et al.

(10) Patent No.: US 8,972,136 B2
(45) Date of Patent: Mar. 3, 2015

(54) CONTROL METHOD AND CONTROL APPARATUS FOR FOUR-WHEEL DRIVE VEHICLE

(75) Inventors: Yasushi Yagi, Hiroshima (JP); Hiroto Kawano, Hiroshima (JP); Tomohiro Nozu, Anjo (JP); Akiyoshi Kakita, Toyota (JP); Ryohei Shigeta, Anjo (JP)

(73) Assignees: Mazda Motor Corporation, Hiroshima (JP); JTEKT Corporation, Osaka (JP)

( * ) Notice: Subject to any disclaimer, the term of this patent is extended or adjusted under 35 U.S.C. 154(b) by 325 days.

(21) Appl. No.: 13/559,468

(22) Filed: Jul. 26, 2012

(65) Prior Publication Data

US 2013/0030664 A1    Jan. 31, 2013

(30) Foreign Application Priority Data

Jul. 28, 2011  (JP) .................................. 2011-164987

(51) Int. Cl.
*G06F 7/00* (2006.01)
*B60T 8/175* (2006.01)
(Continued)

(52) U.S. Cl.
CPC ................. *B60T 8/175* (2013.01); *B60K 23/08* (2013.01); *B60K 23/04* (2013.01);
(Continued)

(58) Field of Classification Search
CPC ........... B60K 23/0808; B60K 2520/10; B60K 23/08; B60K 23/04; B60T 8/172; B60T 7/22; B60T 8/1755; B60W 2520/28; B60W 10/184; B60W 10/18

USPC ......... 180/248, 249, 65.21, 242, 65.225, 243, 180/247, 65.275; 701/74, 69, 22, 68, 70, 701/31.4; 475/5, 199; 477/86, 6; 903/902; 70/89; 318/801
See application file for complete search history.

(56) References Cited

U.S. PATENT DOCUMENTS 5,803,197 A * 9/1998 Hara et al. .................... 180/248
6,000,488 A   12/1999 Atkinson
(Continued)

FOREIGN PATENT DOCUMENTS

CN  101992690 A  3/2011
CN  102126430 A  7/2011
(Continued)

OTHER PUBLICATIONS

The extended European Search Report dated Oct. 31, 2012, which corresponds to European Patent Application No. 12177948.2-2423 and is related to U.S. Appl. No. 13/559,468.
(Continued)

*Primary Examiner* — Behrang Badii
(74) *Attorney, Agent, or Firm* — Studebaker & Brackett PC

(57) ABSTRACT

Discloses is a method of controlling a four-wheel drive vehicle equipped with a torque distribution device capable of changing a torque distribution amount for secondary driven wheels according to an input current to be applied thereto. This method comprises the steps of: applying, to the torque distribution device, a current value corresponding to a target torque distribution amount; and, performing a current changing control for increasing and reducing the input current to the torque distribution device. The step of performing a current changing control includes causing the input current to the torque distribution device to be temporarily increased to a value greater than the current value corresponding to the target torque distribution amount, and then returned to the current value corresponding to the target torque distribution amount, and repeating the temporary increasing of the input current at least at intervals of a predetermined time.

8 Claims, 5 Drawing Sheets

(51) Int. Cl.
*B60K 17/35* (2006.01)
*B60W 50/06* (2006.01)
*B60K 17/02* (2006.01)
*B60K 17/34* (2006.01)
*B60W 10/02* (2006.01)
*B60W 30/18* (2012.01)
B60K 23/08 (2006.01)
B60K 23/04 (2006.01)
B60W 10/184 (2012.01)
B60T 8/1755 (2006.01)
B60T 7/22 (2006.01)
B60W 10/18 (2012.01)
B60T 8/172 (2006.01)

(52) U.S. Cl.
CPC ......... *B60W 2520/28* (2013.01); *B60W 10/184* (2013.01); *B60T 8/1755* (2013.01); *B60T 7/22* (2013.01); *B60W 10/18* (2013.01); *B60T 8/172* (2013.01); *B60K 17/35* (2013.01); *B60T 2201/14* (2013.01); *B60T 2270/202* (2013.01); *B60T 2270/302* (2013.01); *B60K 23/0808* (2013.01); *B60K 2023/0858* (2013.01); *B60W 50/06* (2013.01); *B60K 17/02* (2013.01); *B60K 17/34* (2013.01); *B60W 10/02* (2013.01); *B60W 30/18* (2013.01); *B60W 2720/403* (2013.01)
USPC ................................. 701/69; 701/66; 701/70

(56) References Cited

U.S. PATENT DOCUMENTS

| | | | |
|---|---|---|---|
| 6,898,504 B2 * | 5/2005 | Kadota | 701/67 |
| 7,004,018 B2 * | 2/2006 | Kadota et al. | 73/115.02 |
| 7,140,459 B2 * | 11/2006 | Shimizu | 180/65.225 |
| 7,140,460 B2 * | 11/2006 | Shimizu et al. | 180/65.225 |
| 7,152,707 B2 * | 12/2006 | Matsuda | 180/243 |
| 7,234,553 B2 * | 6/2007 | Shimizu et al. | 180/65.25 |
| 8,489,304 B2 * | 7/2013 | Noguchi et al. | 701/90 |
| 2004/0040375 A1 * | 3/2004 | Kadota et al. | 73/116 |
| 2011/0035090 A1 * | 2/2011 | Noguchi et al. | 701/29 |
| 2011/0167944 A1 | 7/2011 | Yoshinami et al. | |

FOREIGN PATENT DOCUMENTS

| | | |
|---|---|---|
| EP | 1 308 337 A2 | 5/2003 |
| EP | 1 359 046 A2 | 11/2003 |
| JP | 2001-193757 A | 7/2001 |

OTHER PUBLICATIONS

The first Office Action issued by the Chinese Patent Office on Sep. 28, 2014, which corresponds to Chinese Patent Application No. 201210262438.8 and is related to U.S. Appl. No. 13/559,468; with English language summary.

* cited by examiner

CONTROL METHOD AND CONTROL APPARATUS FOR FOUR-WHEEL DRIVE VEHICLE

BACKGROUND OF THE INVENTION

1. Field of the Invention

The present invention relates to a four-wheel drive vehicle. In particular, the present invention relates to a control method and a control apparatus for a four-wheel drive vehicle, designed to automatically control torque (driving force) distribution between front and rear wheels according to a running state of the vehicle, and belongs to the field of vehicle running control techniques.

2. Description of the Background Art

In relation to a four-wheel drive vehicle adapted to transmit torque to both front and rear wheels, there have been known various drive systems, such as a full-time four-wheel drive system, and a system capable of switching between two-wheel drive and four-wheel drive based on driver's selection. In addition, recent years, a system capable of automatically controlling torque distribution between front and rear wheels according to a running state of the vehicle has been put into practical use.

In a vehicle employing such an automatic torque distribution system, for example, assuming that the front wheels serve as primary driven wheels and the rear wheels serve as secondary driven wheels, it becomes possible to fundamentally control a drive mode of the vehicle to be set to a two-wheel drive mode for driving only front wheels, and, according to a change in the running state such as an increase in vehicle speed or an increase in steering angle of a steering wheel, controllably distribute torque to the rear wheels. Further, considering torque loss due to slip of the primary driven wheels caused, for example, by a road surface with a low friction coefficient (low μ road), transmission loss of driving force to the secondary driven wheels, etc, the most efficient torque distribution can be realized. In this case, it becomes possible to enhance overall performance including vehicle running performance, steering stability and fuel economy performance.

The torque distribution to the secondary driven wheels is performed using a torque distribution device composed, for example, of an electromagnetic coupling disposed in a driving force transmission path for transmitting torque to the secondary driven wheels therethrough and adapted to be electrically controlled. Specifically, an input current to be applied to the torque distribution device is controlled to control a torque transmission capacity of the device and thereby variably control a torque distribution ratio for the secondary driven wheels according to the running state, for example, within the range of 0 to 50% with respect to the entire torque.

In an electrically-controlled torque distribution device, such as the above electromagnetic coupling, as illustrated in FIG. 7, a characteristic of torque transmission capacity with respect to input current applied thereto is different between when a current value of the input current is increasing as indicated by the curve A and when the current value is decreasing as indicated by the curve B, i.e., a so-called hysteresis occurs. Thus, even if the input current is maintained at the same value $I_0$, the torque transmission capacity varies in the range of $T_1$ to $T_2$ depending on whether the input current is increasing or decreasing.

In this connection, JP 2001-193757A discloses an invention concerning a coupling disposed in a driving force transmission path of a vehicle, which is intended to reduce hysteresis in torque transmission capacity which would otherwise occur due to a frictional resistance in a spline fitting portion, by an improvement in mechanical structure. However, this invention relates to neither a technique for torque distribution between front and rear wheels in a four-wheel drive vehicle, nor a countermeasure against electrical hysteresis in the above torque distribution device.

SUMMARY OF THE INVENTION

It is an object of the present invention to suppress an influence of a hysteresis characteristic of an electrically-controlled torque distribution device provided in a driving force transmission path for secondary driven wheels, to enhance accuracy in control of torque distribution between front and rear wheels by the device.

In order to achieve the above object, the present invention provides a method for controlling a four-wheel drive vehicle which comprises: a driving source; primary driven wheels; secondary driven wheels; and a torque distribution device capable of distributing a torque input thereinto from the driving source, not only to the primary driven wheels but also to the secondary driven wheels, and changing a torque distribution amount for the secondary driven wheels, according to an input current to be applied thereto. This method comprises the steps of: determining a target torque distribution amount for the secondary driven wheels according to a running state of the vehicle; applying, to the torque distribution device, a current value corresponding to the determined target torque distribution amount; and, when the vehicle is in a predetermined running state, performing a current changing control for increasing and reducing the input current to the torque distribution device. The step of performing a current changing control includes causing the input current to the torque distribution device to be temporarily increased to a value greater than the current value corresponding to the target torque distribution amount, and then returned to the current value corresponding to the target torque distribution amount, and repeating the temporary increasing of the input current at least at intervals of a predetermined time.

DESCRIPTION OF THE PREFERRED EMBODIMENTS

The present invention will now be described based on a four-wheel drive vehicle control apparatus according to one embodiment thereof. In the following description, an operation of this control apparatus corresponds to a four-wheel drive vehicle control method according to one embodiment of the present invention.

Figure 1:
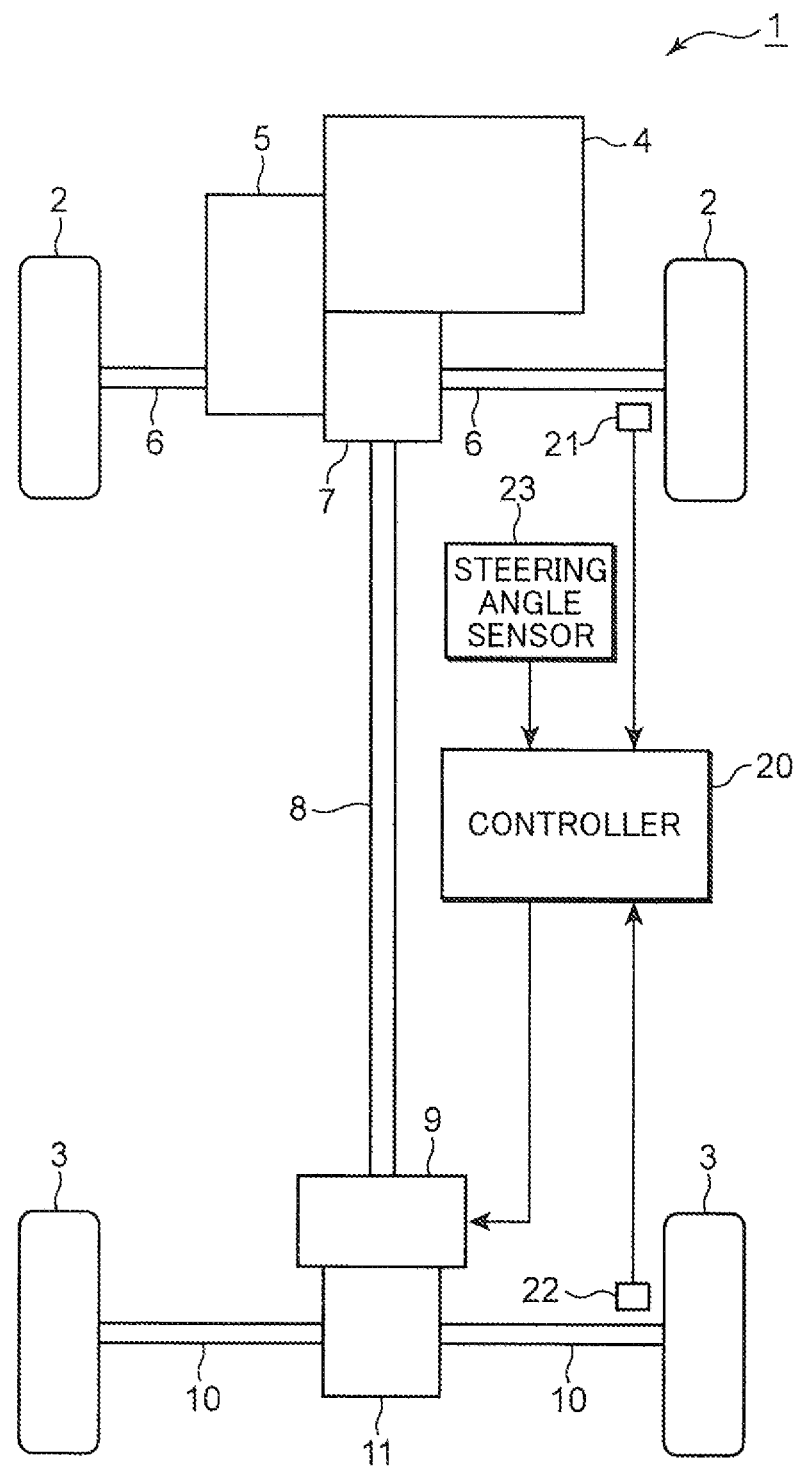
FIG. 1 is a schematic diagram illustrating a drive system of a vehicle which employs a method and apparatus according to one embodiment of the present invention.

With reference to FIG. 1, a configuration of a vehicle 1 employing the control apparatus according to this embodiment will first be described. This vehicle 1 is a four-wheel drive vehicle designed based on a front-engine front-drive vehicle in such a manner that right and left front wheels 2, 2 serve as primary driven wheels, and right and left rear wheels 3, 3 serve as secondary driven wheels. The vehicle 1 comprises, as components of a drive system thereof: an engine 4 (driving source); a transmission 5 adapted to receive a power output of the engine 4 and change a speed reduction ratio according to a running state of the vehicle 1 automatically or manually; a front-wheel differential unit 7 adapted to receive an output of the transmission 5 and distribute a torque (driving force) to be transmitted to the front wheels 2, 2, to the respective front wheels 2, 2 via corresponding front axles 6, 6; a driving force takeoff shaft 8 for taking off the output of the transmission 5 toward the rear wheels 3, 3 via the differential unit 7; a coupling 9 adapted to receive a torque from the driving force takeoff shaft 8 and serving as a torque distribution device; and a rear-wheel differential unit 11 adapted to distribute a torque output from the coupling 9 to the respective rear wheels 3, 3 via corresponding rear axles 10, 10.

The coupling 9 is engaged with an engagement force corresponding to an input current applied thereto, thereby producing a torque transmission capacity which is variably controlled according to a current value of the input current. When the coupling 9 is fully engaged, the torque transmission capacity of the coupling 9 is maximized, so that the entire torque input from the driving force takeoff shaft 8 is directly output to the rear-wheel differential unit 11. In this case, a torque distribution ratio between the front and rear wheels 2, 3 is about 50:50. When the coupling 9 is fully disengaged, the torque transmission capacity of the coupling 9 is minimized (zero), so that no torque is output to the rear-wheel differential unit 11. In this case, the torque distribution ratio between the front and rear wheels 2, 3 is 100:0. When the torque distribution ratio has a value intermediate therebetween, a torque equal to the torque transmission capacity of the coupling 9 is output to the rear-wheel differential unit 11. This output torque corresponds to a torque distribution amount for the rear wheels 3, 3.

The vehicle 1 is provided with a controller 20 for controlling the torque transmission capacity of the coupling 9 to control torque distribution between the front and rear wheels 2, 3 according to the running state of the vehicle 1. In this embodiment, signals from two wheel speed sensors 21, 22 each operable to detect a wheel speed of a respective one of the front wheel 2 and the rear wheel 3, and a signal from a steering angle sensor 23 operable to detect a steering angle of a steering wheel (not illustrated), are input into the controller 20. The controller 20 is operable, based on these signals, to control an input current to be applied to the coupling 9, to obtain torque distribution between the front and rear wheels 2, 3 in such a manner that it becomes the most suitable for a running state of the vehicle 1 at each time.

Specifically, in a stable running state where: a vehicle speed detected based on the signals from the wheel speed sensors 21, 22 is a predetermined value or less; a steering angle indicated by the signal from the steering angle sensor 23 is approximately zero; and a slip amount in each of the front and rear wheels 2, 3 detected based on a difference between respective wheel speeds of the front and rear wheels 2, 3 indicated by the signals from the wheel speed sensors 21, 22 is approximately zero, a drive mode of the vehicle 1 is set to a two-wheel drive mode in which torque is distributed only to the front wheels 2 without torque distribution to the rear wheels 3.

Then, when the vehicle speed becomes greater than the predetermined value, or the steering angle becomes greater than a predetermined value, a torque distribution amount for the rear wheels 3 is increased within a predetermined range, according to an increase in the vehicle speed or the steering angle. Similarly, when the slip amount of the front wheel 2 as the primary drive wheel becomes greater than a predetermined value, the torque distribution amount for the rear wheels 3 is increased within a predetermined range, according to an increase in the slip amount. The torque distribution amount for the rear wheels 3 is also controlled to minimize a total loss of a loss of driving force due to slip of the front wheels 2, a loss of driving force due to slip of the rear wheels 3, a mechanical loss of driving force occurring in a driving force transmission path for transmitting torque to the rear wheels 3 (because it becomes longer than a driving force transmission path for the front wheels 2) and others.

Figure 2:
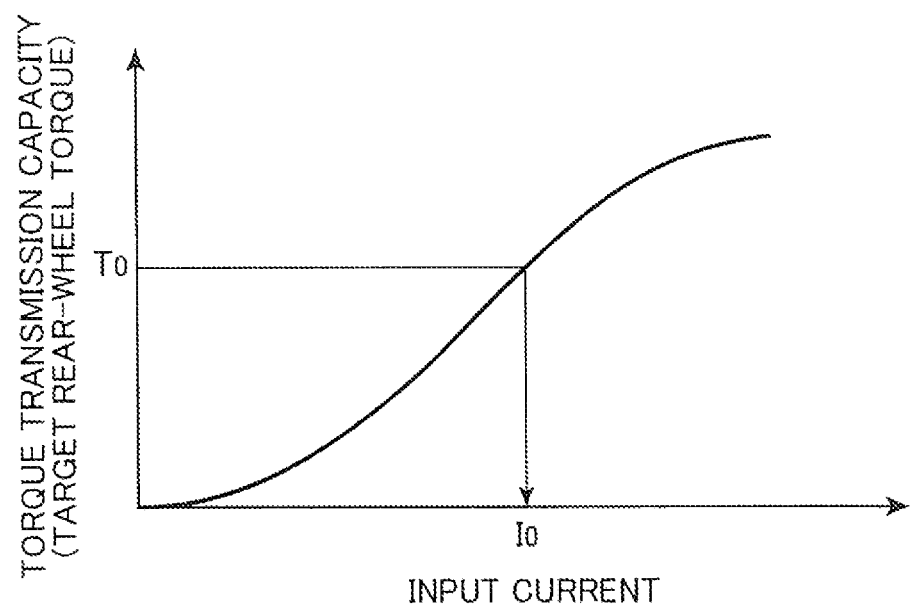
FIG. 2 is a graph illustrating a map for use during torque distribution control performed in the vehicle.

For such torque distribution control, the controller 20 has a map which indicates a relationship between the input current to the coupling 9 and the torque transmission capacity, as illustrated in FIG. 2. Based on this map, the controller 20 is operable to sequentially derive a value $I_0$ of the input current to be applied to the coupling 9, so as to obtain a torque transmission capacity appropriate to a running state of the vehicle 1, i.e., so as to allow a torque to be distributed to the rear wheels 3 (hereinafter referred to as "rear-wheel torque") to become equal to a target torque $T_0$ appropriate to the running state (hereinafter referred to as "target rear-wheel torque $T_0$").

Characteristics of the torque transmission capacity of the coupling 9 exhibit hysteresis, i.e., even if electricity to be applied to the coupling 9 is maintained at the same value, the torque transmission capacity varies in a predetermined range, depending on whether the input current is increasing or decreasing. Therefore, the controller 20 is configured to perform correction control considering the hysteresis, during control of the torque transmission capacity of the coupling 9. Based on the flowchart illustrated in FIG. 3, an operation of the control for the coupling 9 including the correction control will be described.

Figure 3:
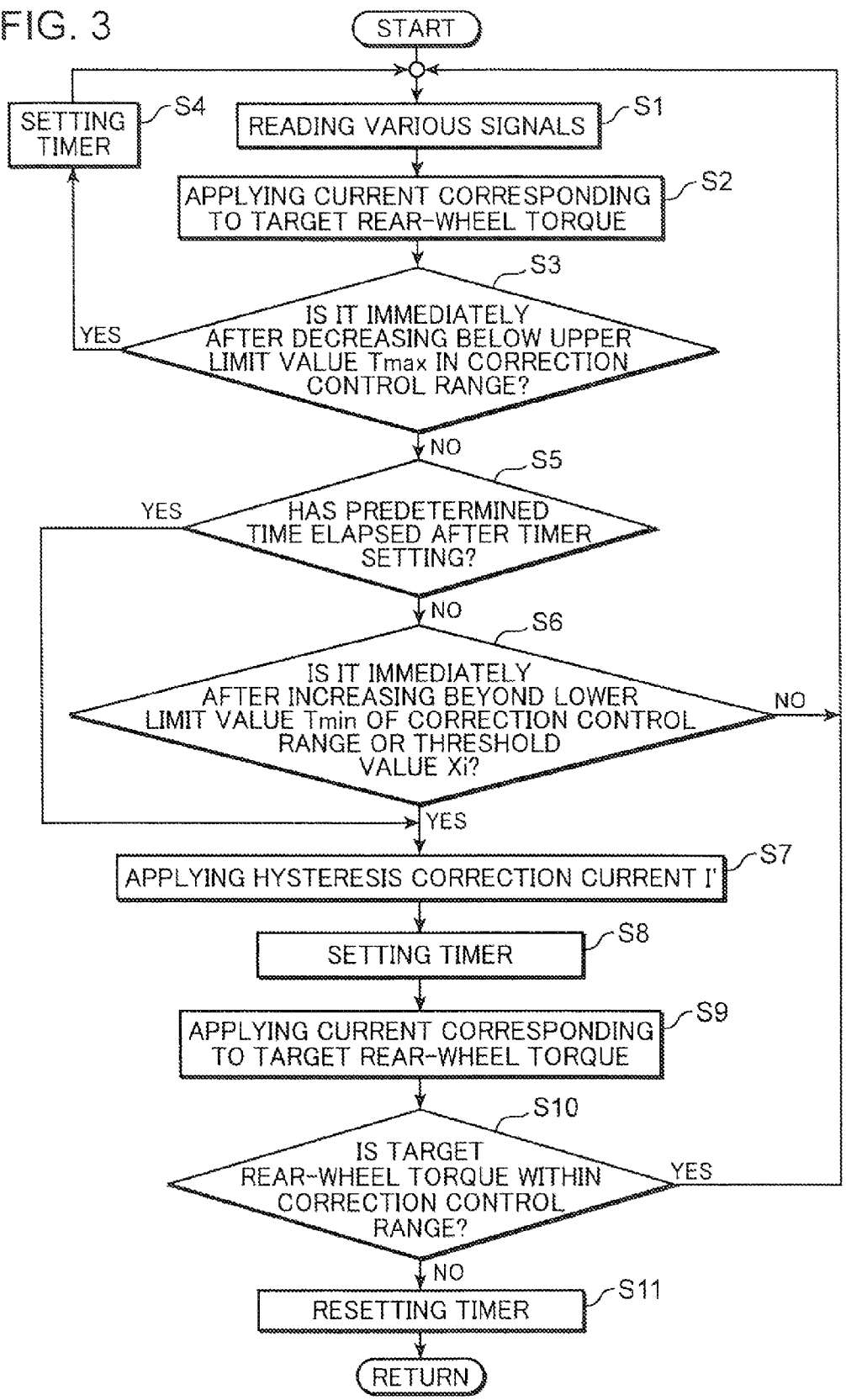
FIG. 3 is a flowchart illustrating one example of an operation of the torque distribution control.

The control (control of torque distribution to the rear wheels 3) in the flowchart illustrated in FIG. 3 is started when the controller 20 determines that a drive mode of the vehicle 1 should be changed from the two-wheel drive mode in which no torque is distributed to the rear wheels 3, to a four-wheel drive mode in which torque is additionally distributed to the rear wheels 3. Upon start of this control process, in Step S1, the controller 20 first reads various signals from the wheel speed sensors 21, 22, the steering angle sensor 23, etc. Then, in Step S2, the controller 20 starts control of setting a target rear-wheel torque $T_0$ appropriate to a running state of the vehicle 1 indicated by the read signals, and applying, to the coupling 9, a current I (FIG. 4) corresponding to the target rear-wheel torque $T_0$. More specifically, the controller 29 reads, from the map in FIG. 2, a current value $I_0$ which allows the rear-wheel torque to become equal to the target rear-wheel torque $T_0$, i.e., a current value $I_0$ which allows the coupling 9 to have a torque transmission capacity capable of transmitting the target rear-wheel torque $T_0$ to the rear wheels 3, and applies, to the coupling 9, a control current I controlled to become equal to the current value $I_0$.

Figure 4:
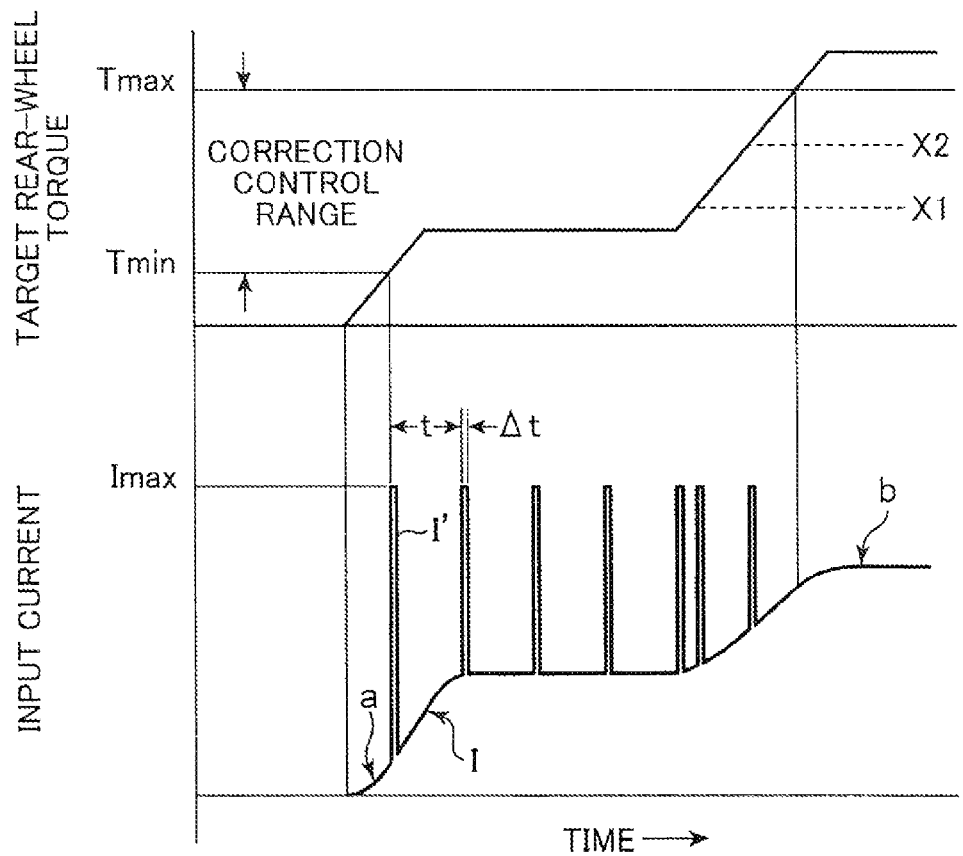
FIG. 4 is a time chart illustrating one example of the operation of the torque distribution control.

Then, in Step S3, the controller 20 determines whether or not it is immediately after the target rear-wheel torque $T_0$ decreases from a value greater than an upper limit value Tmax of a correction control range illustrated in FIG. 4, to a value equal to or less than the upper limit value Tmax. As used here, the term "correction control range" means a range of the target rear-wheel torque $T_0$ in which the correction control considering the hysteresis characteristic of the coupling 9 (hysteresis correction control) is to be performed, as illustrated in FIG. 4. For example, a lower limit value Tmin is set in the range of 0.5 to 1.5 N·m, and the upper limit value Tmax is set in the range of 200 to 300 N·m.

When a result of the determination in the Step S3 is YES, i.e., it is ascertained that the target rear-wheel torque $T_0$ changes across the upper limit value Tmax of the correction control range in a decreasing direction, the controller 20 sets a timer to start clocking, in Step S4.

In a situation where the present time is just after start of the torque distribution control to the rear wheels 3 (FIG. 3), the target rear-wheel torque $T_0$ is small. Thus, the result of the determination in the Step S3 is obviously NO. Then, in the subsequent Step S5, the controller 20 determines whether or not a predetermined time (time t illustrated in FIG. 4) has elapsed after the timer setting. At this time, the timer has not yet been set. Thus, a result of the determination is NO.

When the result of the determination in the Step S5 is NO, the controller 20 determines, in the subsequent Step S6, whether or not it is immediately after the target rear-wheel torque $T_0$ increases beyond the lower limit value Tmin of the correction control range illustrated in FIG. 4, or a threshold value Xi set within the correction control range. In this embodiment, the threshold value Xi may be a plurality of values set within a range of greater than the lower limit value Tmin to less than the upper limit value Tmax in the correction control range.

FIG. 4 illustrates an example in which two threshold values X1, X2 are set as the threshold value Xi. In this example, the determination in the Step S6 is made as YES, when the target rear-wheel torque $T_0$ changes across the lower limit value Tmin of the correction control range in an increasing direction, or across one of the threshold values X1, X2 in the increasing direction.

In the step S6, when it is determined that the target rear-wheel torque $T_0$ does not increase beyond the lower limit value Tmin of the correction control range and the threshold value Xi, the controller 20 executes the Steps S1 and S2 again to apply, to the coupling 9, the current I corresponding to the target rear-wheel torque $T_0$.

For example, at a time immediately after start of the control of torque distribution to the rear wheels 3 (FIG. 3), the target rear-wheel torque $T_0$ is generally less than the lower limit value Tmin of the correction control range. Thus, as indicated by the code a in FIG. 4, after start of the control of torque distribution to the rear wheels 3, the hysteresis correction control is not performed until the target rear-wheel torque $T_0$ increased beyond the lower limit value Tmin of the correction control range. In other words, a normal control of applying the current I to the coupling 9 so as to allow the rear-wheel torque to become equal to the target rear-wheel torque $T_0$ appropriate to the running state is performed.

On the other hand, in the Step S6, when it is determined that the target rear-wheel torque $T_0$ increases beyond the lower limit value Tmin of the correction control range or the threshold value Xi, the controller 20 operates to apply a hysteresis correction current I' as illustrated in FIG. 4, as the hysteresis correction control, in the subsequent Step S7. A maximum value Imax of the hysteresis correction current I' is set to be sufficiently greater than the current I corresponding to the torque distribution amount for the rear wheels 3 during the normal control (for example, the hysteresis correction current I' is set in the range of 1 to 3 A). Further, an input duration Δt of the hysteresis correction current I' is set to an extremely short time (for example, set in the range of 0.1 to 0.3 sec).

Therefore, the hysteresis correction current I' is formed to have a pulsed current waveform having a small pulse width.

In the hysteresis correction control, because the hysteresis correction current I' has a large current value, the rear-wheel torque will rapidly increase when the current I' is applied to the coupling 9, which is likely to provide a feeling of strangeness to a passenger. However, in this embodiment, the hysteresis correction current I' is formed as a pulsed current having an extremely-short pulse duration, as illustrated in FIG. 4. Thus, even if the torque transmission capacity of the coupling 9 is temporarily increased in response to an increase in current value, a rapid change in torque is eased in the course of the transmission of torque to the rear wheels 3 via the rear-wheel differential unit 11 and others, so that it becomes possible to avoid providing a feeling of strangeness to a passenger. In this manner, during execution of the hysteresis correction control, the input current to the coupling 9 is set such that it is increased from the current I corresponding to the target rear-wheel torque $T_0$ to the hysteresis correction current I', and then returned to the current I corresponding to the target rear-wheel torque $T_0$, before an amount of torque to be transmitted to the rear wheels substantially changes along with the increase in the input current (before the increase in the input current actually affects torque of the rear wheels).

After applying the hysteresis correction current I' in the Step S7, the controller 20 sets a timer to start clocking, in the subsequent Step S8. Further, in Step S9, subsequently to the application of the hysteresis correction current I', the controller 20 operates to apply, to the coupling 9, the current I corresponding to the target rear-wheel torque $T_0$ appropriate to the running state of the vehicle 1, in the same manner as that in the Step S2.

Figure 5:
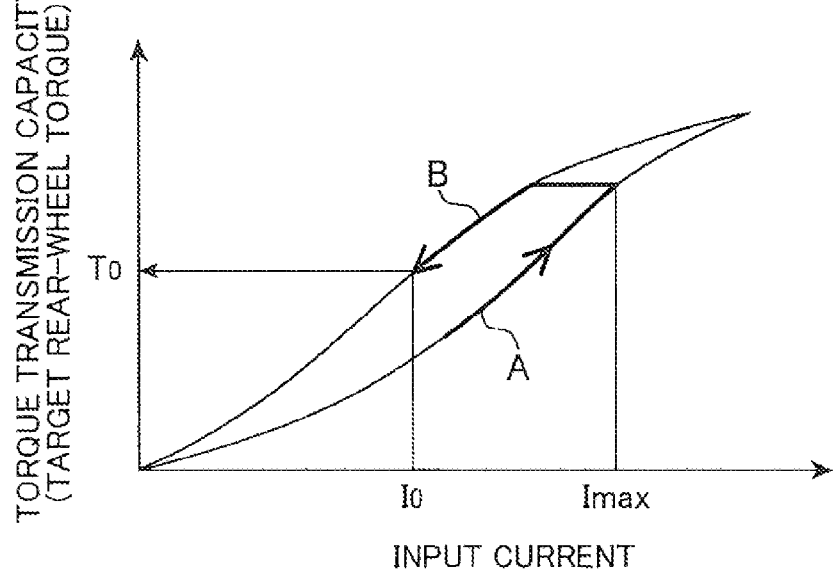
FIG. 5 is a graph for explaining a function of the torque distribution control.

As above, the input current to be applied to the coupling 9 is temporarily increased rapidly from the current I corresponding to the target rear-wheel torque $T_0$, and, immediately after the increase, returned to the current I corresponding to the target rear-wheel torque $T_0$, again. Consequently, as illustrated in FIG. 5, the current I to be applied to the coupling 9 can be considered as a current having a current value which has decreased from the maximum current value Imax of the hysteresis correction current I'. Thus, the torque transmission capacity to be obtained by applying this current I has a value on the curve indicated by the code B in FIG. 5 (characteristic line when the input current is decreasing).

Then, in Step S10, the controller 20 determines whether or not the target rear-wheel torque $T_0$ is within the correction control range (of Tmin to Tmax). When the target rear-wheel torque $T_0$ is within the correction control range (a result of the determination is YES), the controller 20 executes the Steps S1 and S2 again to apply, to the coupling 9, the current I corresponding to the target rear-wheel torque $T_0$ at the time. Then, in the subsequent Step S5, the controller 20 determines whether or not the predetermined time t has elapsed after the timer setting in the Step S8. For example, the predetermined time t is set in the range of about 30 to 180 seconds.

At the present time (when the determination in the Step S5 is performed for the first time, after applying the hysteresis correction current I'), a result of the determination is NO, because it is just after the timer setting. Thus, in the subsequent Step S6, the controller 20 determines whether or not it is immediately after the target rear-wheel torque $T_0$ increases beyond the lower limit value Tmin of the correction control range or beyond the threshold value Xi. In this case, the target rear-wheel torque $T_0$ has already increased beyond the lower limit value Tmin or the threshold value Xi, so that a result of the determination at the Step S6 is NO. Therefore, the control operations in the Steps S1 and S2 will be repeated to perform the control of applying, to the coupling 9, the current I corresponding to the target rear-wheel torque $T_0$ appropriate to the running state.

Thus, unless the target rear-wheel torque $T_0$ increases within the correction control range and newly passes beyond the threshold value Xi, the Steps S1 and S2 will be repeated until it is ascertained that the predetermined time t elapses, in the Step S5, and, during the repetition, the control of applying, to the coupling 9, the current I corresponding to the target rear-wheel torque $T_0$ appropriate to the running state, will be performed.

When the determination in the Step S5 is made as YES during the repetition of the control operations in the Steps S1 and S2, i.e., when it is ascertained that the elapsed time after the timer setting reaches the predetermined time t, the controller 20 executes the Steps S7 to S9 again to apply the hysteresis correction current I' to the coupling 9, and subsequently apply, to the coupling 9, the current I corresponding to the target rear-wheel torque $T_0$ appropriate to the running state of the vehicle 1. Further, the timer is set to start clocking again.

There is a possibility that, during the repetition of the control operations in the Steps S1 and S2, the target rear-wheel torque $T_0$ increases and newly passes beyond the threshold value Xi within the correction control range. In this case, the determination in the Step S6 is also made as YES. For example, there is a possibility that the target rear-wheel torque $T_0$ which has already increased beyond the lower limit value Tmin of the correction control range further increases beyond the threshold value X1 set within the correction control range, before the predetermined time t elapses from the timer setting. When such an event is ascertained, the determination in the Step S6 is made as YES. Thus, the controller 20 executes the Steps S7 to S9 again to perform application of the hysteresis correction current I' and others.

As above, in this embodiment, when the target rear-wheel torque $T_0$ increases beyond the lower limit value Tmin of the correction control range, the hysteresis correction current I' is initially applied. Then, when the elapsed time after the application reaches the predetermined time t or when the target rear-wheel torque $T_0$ increases beyond the threshold value (X1 or X2) within the correction control range, the hysteresis correction current I' is applied again.

In the example illustrated in FIG. 4, after the target rear-wheel torque $T_0$ increases beyond the lower limit value Tmin of the correction control range, it continues in a range of less than the threshold value X1 for a while. Thus, in a period of time before the target rear-wheel torque $T_0$ increases beyond the threshold value X1, the hysteresis correction current I' is applied to the coupling 9 at intervals of a predetermined time t (e.g., in the range of 30 to 180 seconds). Subsequently, the target rear-wheel torque $T_0$ will increase beyond the threshold value X1 and further beyond the larger threshold value X2. In response to each of these events, the hysteresis correction current I' is also applied to the coupling 9. In this case, the hysteresis correction current I' is applied immediately after the target rear-wheel torque $T_0$ increases beyond the threshold value X1 or X2, irrespective of whether or not the predetermined time t has elapsed.

Every time the hysteresis correction current I' is applied to the coupling 9 in the above manner, the torque transmission capacity of the coupling 9, i.e., the rear-wheel torque, is corrected to a value on the curve B in FIG. 5. This makes it possible to suppress a variation in the torque transmission capacity or the rear-wheel torque, due to the hysteresis characteristic of the coupling 9.

In this embodiment, the hysteresis characteristic of the coupling 9 illustrated in FIG. 5 is known. Thus, it is possible to preliminarily create the map in FIG. 2, based on the curve B in FIG. 5. Then, the rear-wheel torque can be accurately controlled to conform to the target rear-wheel torque $T_0$ by reading a current value $I_0$ corresponding to the target rear-wheel torque $T_0$ from the map, and applying, to the coupling 9, a control current I having a value controlled to become equal to the current value $I_0$, while intermittently applying the hysteresis correction current I' greater than the current I.

Figure 6:
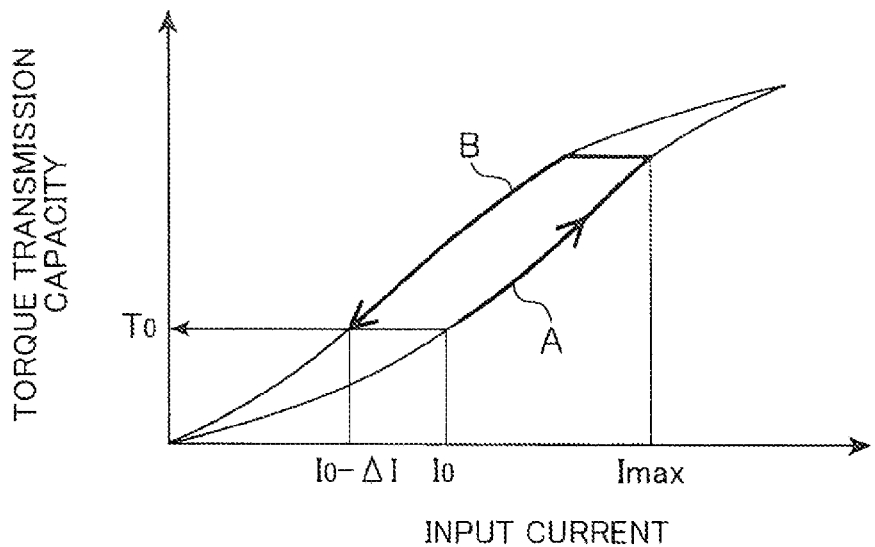
FIG. 6 is a graph for explaining another function of the torque distribution control.
Figure 7:
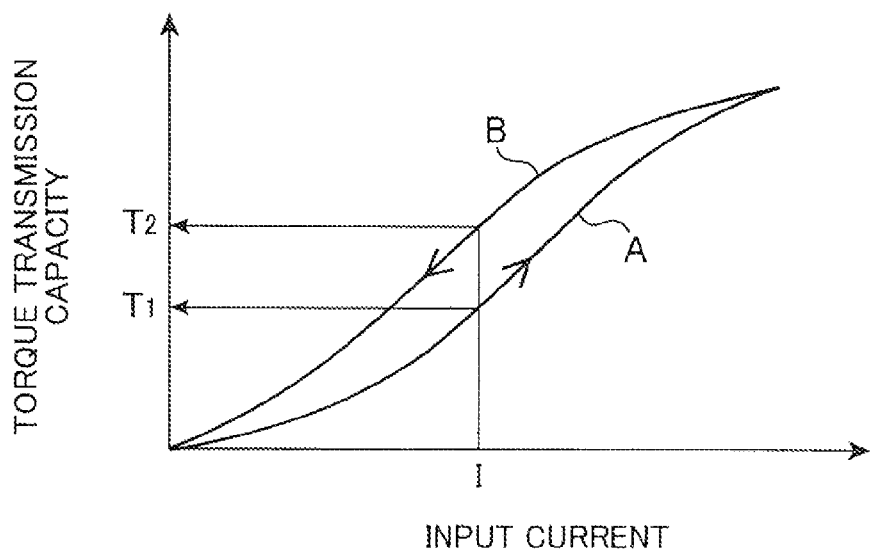
FIG. 7 is a graph for explaining a hysteresis characteristic of a torque distribution device.

On the other hand, in the case where the map in FIG. 2 is created based on the curve A in FIG. 5, considering that the characteristic of torque transmission capacity is changed from the curve A to the curve B by the application of the hysteresis correction current I', it is necessary to correct a current value read from the map. For example, the correction may be realized by a technique illustrated in FIG. 6. Specifically, assuming that after applying the hysteresis correction current I' to the coupling 9, a target rear-wheel torque determined according to a running state of the vehicle 1 is $T_0$, and a current value read from the map is $I_0$, a current I to be applied to the coupling at the time is set to a value obtained by subtracting a correction value $\Delta I$ from the current value $I_0$. This makes it possible to accurately control the rear-wheel torque to conform to the target rear-wheel torque $T_0$ in accordance with the characteristic of the curve B.

When it is ascertained that the target rear-wheel torque $T_0$ is not within the correction control range (of Tmin to Tmax), the controller 20 resets (stops) the timer, in the subsequent Step S11, and returns to the Step S1. Subsequently, unless the predetermined time t elapses after the target rear-wheel torque $T_0$ changes across the upper limit value Tmax of the correction control range in the decreasing direction (the determination in the Step S5 is made as YES after the determination in the Step S3 is made as YES), or the target rear-wheel torque $T_0$ increases beyond the lower limit value Tmin of the correction control range or the threshold value Xi (the determination in the Step S6 is made as YES), the normal current control is performed. Specifically, as indicated by the code b in FIG. 4, the control of applying the current I read from the map to the coupling 9 so as to obtain the target rear-wheel torque $T_0$ appropriate to the running state (Steps S1 and S2) is performed without performing the hysteresis correction control of temporarily increasing the current. A situation where the target rear-wheel torque $T_0$ changes to a value outside of the correction control range, and then increases beyond the lower limit value Tmin or the threshold value Xi again includes the following two cases. One case is in which, after the target rear-wheel torque $T_0$ increases beyond the upper limit value Tmax of the correction control range once, it decreases to fall within the correction control range again, and then increases beyond the threshold value X1 or X2. The other case is in which after the target rear-wheel torque $T_0$ decreases below the lower limit value Tmin of the correction control range once, it increases beyond the lower limit value Tmin.

As mentioned above, the hysteresis correction control is performed only if the target rear-wheel torque $T_0$ is in the correction control range (of Tmin to Tmax), for the following reason. When the target rear-wheel torque $T_0$ is less than the lower limit value Tmin of the correction control range, the influence of the hysteresis characteristic of the coupling 9 is insignificant, so that there is no need to perform the hysteresis correction control. When the target rear-wheel torque $T_0$ is greater than the upper limit value Tmax of the correction control range, the front wheels 2 as the primary driven wheels are in a situation where wheel slip is more likely to occur, and thereby control of relatively largely changing the rear-wheel torque is performed to stabilize the front wheels 2. Therefore, even if the control for suppressing a variation in the rear-wheel torque due to the hysteresis characteristic is performed in such a situation, it has little effect. Thus, the correction control range is set to avoid energy loss due to such unprofitable correction controls.

In the above embodiment, when the target rear-wheel torque $T_0$ changes across the lower limit value Tmin of the correction control range in the increasing direction, the timer is set to start clocking, and the control of applying the hysteresis correction current I' (hysteresis correction control) is immediately started. Alternatively, only the timer setting may be performed. In this case, the hysteresis correction control is not performed until the predetermined time t elapses after the target rear-wheel torque $T_0$ increases beyond the lower limit value Tmin (or until the target rear-wheel torque $T_0$ increases beyond the threshold value Xi within the correction control range).

Lastly, distinctive features disclosed in the above embodiment and advantages based thereon will be outlined below.

A technique disclosed in the above embodiment relates to a method for controlling a four-wheel drive vehicle which comprises: a driving source (4); primary driven wheels (2); secondary driven wheels (3); and a torque distribution device (9) capable of distributing a torque input thereinto from the driving source (4), not only to the primary driven wheels (2) but also to the secondary driven wheels (3), and changing a torque distribution amount for the secondary driven wheels (3), according to an input current to be applied thereto. This method comprises the steps of: determining a target torque distribution amount ($T_0$) for the secondary driven wheels (3) according to a running state of the vehicle; applying, to the torque distribution device (9), a current value (I) corresponding to the determined target torque distribution amount ($T_0$); and, when the vehicle is in a predetermined running state, performing a current changing control for increasing and reducing the input current to the torque distribution device (9). The step of performing a current changing control includes causing the input current to the torque distribution device (9) to be temporarily increased to a value (I') greater than the current value (I) corresponding to the target torque distribution amount ($T_0$), and then returned to the current value (I) corresponding to the target torque distribution amount ($T_0$), and repeating the temporary increasing of the input current at least at intervals of a predetermined time (t).

In the above method, a torque distribution amount for the secondary driven wheels (i.e., a torque transmission capacity of the torque distribution device) can be controlled by controlling the input current to be applied to the torque distribution device. Thus, it becomes possible to continually realize optimal torque distribution, according to a running state of the vehicle, such as vehicle speed, steering angle of a steering wheel or wheel slip state, thereby enhancing overall performance including vehicle running performance, steering stability and fuel economy performance.

The torque distribution device has hysteresis in characteristic of torque transmission capacity with respect to input current applied thereto. Thus, even if the input current is maintained at the same value, the torque transmission capacity varies depending on whether the input current is increasing or decreasing. In order to cope with this problem, this method is configured to, when the vehicle is in a predetermined running state, perform the current changing control of causing the input current to be temporarily increased to a value greater than the current value corresponding to the target torque distribution amount, and then returned to the current value corresponding to the target torque distribution amount, at least at intervals of a predetermined time. Consequently, the characteristic of torque transmission capacity of the torque distribution device is maintained in that to be obtained when the input current is decreasing, so that it becomes possible to suppress a variation in the torque transmission capacity due to the hysteresis and enhance accuracy in control of torque distribution between front and rear wheels according to the running state of the four-wheel drive vehicle.

Preferably, in the above method, the current changing control is prohibited when the target torque distribution amount ($T_0$) for the secondary driven wheels (3) is greater than a predetermined upper limit value (Tmax).

This makes it possible to avoid energy loss due to an unnecessary increase in current value.

More specifically, when the target torque distribution amount for the secondary driven wheels is greater than the upper limit value, mainly, the primary driven wheels are in a situation where wheel slip is more likely to occur, and thereby control of relatively largely changing the torque distribution amount for the secondary driven wheels is performed to stabilize the primary driven wheels. Therefore, even if the control for suppressing the variation due to the hysteresis is performed in such a situation, it has little effect. Thus, in such a situation, the current changing control is prohibited, so that it becomes possible to avoid the occurrence of undesirable energy loss.

Preferably, in the above method, the current changing control is prohibited when the target torque distribution amount ($T_0$) for the secondary driven wheels (3) is less than a predetermined lower limit value (Tmin).

In this case, when the torque distribution amount for the secondary driven wheels is originally small and thereby the influence of the hysteresis characteristic of the torque distribution device is insignificant, for example, in a situation immediately after start of the torque distribution control, the current changing control is prohibited, so that it becomes possible to avoid energy loss due to an unnecessary increase in current value.

Preferably, in the above method, the input current (f) temporarily increased under the current changing control is returned to the current value (I) corresponding to the target torque distribution amount, before an amount of torque to be transmitted to the secondary driven wheels (3) substantially changes along with the increase in the input current.

This makes it possible to prevent the amount of torque to be transmitted to the secondary driven wheels from rapidly changing due to the current changing control, to avoid providing a feeling of strangeness to a passenger.

The technique disclosed in the above embodiment also relates to an apparatus for controlling a four-wheel drive vehicle which comprises: a driving source (4); primary driven wheels (2); secondary driven wheels (3); and a torque distribution device (9) capable of distributing a torque input thereinto from the driving source (4), not only to the primary driven wheels (2) but also to the secondary driven wheels (3), and changing a torque distribution amount for the secondary driven wheels (3), according to on an input current to be applied thereto. This apparatus comprises: a controller (20) operable to determine a target torque distribution amount ($T_0$) for the secondary driven wheels (3) according to a running state of the vehicle, and apply, to the torque distribution device (9), a current value (I) corresponding to the determined target torque distribution amount ($T_0$). The controller (20) has a function of, when the vehicle is in a predetermined running state, performing a current changing control for increasing and reducing the input current to the torque distribution device (9). The current changing control is configured to cause the input current to the torque distribution device (9) to be temporarily increased to a value (I') greater than the current value (I) corresponding to the target torque distribution amount ($T_0$), and then returned to the current value (I) corresponding to the target torque distribution amount ($T_0$), and repeat the temporary increasing of the input current at least at intervals of a predetermined time (t).

The control apparatus can obtain the same advantageous effects as those in the above method.

INDUSTRIAL APPLICABILITY

As described above, the present invention makes it possible to accurately perform torque distribution control for a four-wheel drive vehicle. Thus, the present invention can be suitably used in the field of manufacturing industries of four-wheel drive vehicles.

This application is based on Japanese Patent application No. 2011-164987 filed in Japan Patent Office on Jul. 28, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for controlling a four-wheel drive vehicle which comprises: a driving source; primary driven wheels; secondary driven wheels; and a torque distribution device capable of distributing a torque input thereinto from the driving source, not only to the primary driven wheels but also to the secondary driven wheels, and changing a torque distribution amount for the secondary driven wheels, according to an input current to be applied thereto, the method comprising the steps of:

determining a target torque distribution amount for the secondary driven wheels according to a running state of the vehicle;

applying, to the torque distribution device, a current value corresponding to the determined target torque distribution amount; and when the vehicle is in a predetermined running state, performing a current changing control for increasing and reducing the input current to the torque distribution device, wherein the step of performing a current changing control includes causing the input current to the torque distribution device to be temporarily increased to a value greater than the current value corresponding to the target torque distribution amount, and then returned to the current value corresponding to the target torque distribution amount, and repeating the temporary increasing of the input current at least at intervals of a predetermined time.

2. The method as defined in claim 1, wherein the current changing control is prohibited when the target torque distribution amount for the secondary driven wheels is greater than a predetermined upper limit value.

3. The method as defined in claim 2, wherein the current changing control is prohibited when the target torque distribution amount for the secondary driven wheels is less than a predetermined lower limit value.

4. The method as defined in claim 3, wherein the input current temporarily increased under the current changing control is returned to the current value corresponding to the target torque distribution amount, before an amount of torque to be transmitted to the secondary driven wheels substantially changes along with the increase in the input current.

5. The method as defined in claim 1, wherein the current changing control is prohibited when the target torque distribution amount for the secondary driven wheels is less than a predetermined lower limit value.

6. The method as defined in claim 5, wherein the input current temporarily increased under the current changing control is returned to the current value corresponding to the target torque distribution amount, before an amount of torque to be transmitted to the secondary driven wheels substantially changes along with the increase in the input current.

7. The method as defined in claim 1, wherein the input current temporarily increased under the current changing control is returned to the current value corresponding to the target torque distribution amount, before an amount of torque to be transmitted to the secondary driven wheels substantially changes along with the increase in the input current.

8. An apparatus for controlling a four-wheel drive vehicle which comprises: a driving source; primary driven wheels; secondary driven wheels; and a torque distribution device capable of distributing a torque input thereinto from the driving source, not only to the primary driven wheels but also to the secondary driven wheels, and changing a torque distribution amount for the secondary driven wheels, according to on an input current to be applied thereto, the apparatus comprising:

a controller operable to determine a target torque distribution amount for the secondary driven wheels according to a running state of the vehicle, and apply, to the torque distribution device, a current value corresponding to the determined target torque distribution amount, the controller having a function of, when the vehicle is in a predetermined running state, performing a current changing control for increasing and reducing the input current to the torque distribution device, wherein the current changing control is configured to cause the input current to the torque distribution device to be temporarily increased to a value greater than the current value corresponding to the target torque distribution amount, and then returned to the current value corresponding to the target torque distribution amount, and repeat the temporary increasing of the input current at least at intervals of a predetermined time.

* * * * *